United States Patent [19]
Hashimoto

[11] Patent Number: 5,188,915
[45] Date of Patent: Feb. 23, 1993

[54] ELECTROLYTE FOR ZINC BROMIDE BATTERY

[75] Inventor: Takafumi Hashimoto, Tokyo, Japan

[73] Assignee: Kabushiki Kaisha Meidensha, Tokyo, Japan

[21] Appl. No.: 561,164

[22] Filed: Aug. 1, 1990

[30] Foreign Application Priority Data

Aug. 2, 1989 [JP] Japan .................... 1-200818

[51] Int. Cl.$^5$ ............................................. H01M 4/58
[52] U.S. Cl. .................................. 429/199; 429/101; 429/105
[58] Field of Search ............... 429/101, 105, 198, 199, 429/29

[56] References Cited

U.S. PATENT DOCUMENTS

| | | | |
|---|---|---|---|
| 4,510,218 | 4/1985 | Ando et al. | 429/198 |
| 4,614,693 | 9/1986 | Hashimoto et al. | 429/105 X |
| 4,663,251 | 5/1987 | Sasaki et al. | 429/29 |
| 4,677,039 | 6/1987 | Sasaki et al. | 429/14 |
| 4,818,642 | 4/1989 | Bellows et al. | 429/105 |

FOREIGN PATENT DOCUMENTS 62167529 1/1989 Japan.
62260889 4/1989 Japan.

Primary Examiner—Anthony Skapars
Attorney, Agent, or Firm—Bachman & LaPointe

[57] ABSTRACT

A secondary battery utilizing a zinc bromide electrolyte has an electrolyte which is composed of a first solution including zinc bromide and a complexing agent which forms a bromide complex from the bromide ions to precipitate the complex in the electrolyte, and a second solution of a zinc compound which is selected from groups of compounds which decompose at a higher voltage than the first solution during battery charging. The concentrations of the first and second solutions are regulated for providing a concentration of zinc ions which are generated from the first and the second solutions at least 0.5 mol/l higher than bromide ions which are generated from the first solution.

5 Claims, 1 Drawing Sheet

ELECTROLYTE FOR ZINC BROMIDE BATTERY

BACKGROUND OF THE INVENTION

Field of the Invention

The present invention relates generally to a composition of an electrolyte utilized for a battery. Specifically, the present invention relates to a composition of an electrolyte utilized for a zinc bromide battery in which electrolyte is circulated.

Description of the Background Art

Recently, studies of batteries as power source have been promoted. Zinc bromide laminated secondary batteries, in which electrolyte is circulated, have been among the types of batteries developed.

Conventionally, composition of the electrolyte utilized for zinc bromide batteries as mentioned above, have been about 2 to 3 mol/l of zinc bromide ($ZnBr_2$) and 0.5 to 1 mol/l of Q-Br (here, Q indicates a complexing agent). However, during a floating operation, which consists of long term charging at a constant voltage, using electrolyte having the above composition for a zinc bromide battery frequently causes generation of hydrogen. Hydrogen is generated by the reaction of $2H^+ = H_2 - 2e^-$ which occurs in place of the reaction of $Zn^{2+} = Zn - 2e^-$ because the concentration of zinc in the electrolyte is diluted due to the long term charging. The generation of hydrogen causes a certain amount of energy loss in the battery. Additionally, hydrogen gas is characteristically inflammable, therefore, its generation is very dangerous as it may cause an explosion if exposed to flame. Furthermore, hydrogen generation raises the hydrogen ion exponent (pH) which deteriorates the efficiency of electrodeposition. This results in generation of hydrogen at the surface of the electrode where zinc is deposited, thus voids are caused to occur and the smoothness of the electrode surface is deteriorated, and dendrites, which are crystals of deposited metal in branch-like formations, tend to be formed. Formation of dendrites is well known to deteriorate adherence of electrodeposited metals.

SUMMARY OF THE INVENTION

It is therefore the principal object of the present invention to provide an electrolyte for a zinc bromide battery having a composition for preventing hydrogen generation when the battery is floated.

It is another object of the present invention to provide an electrolyte for a zinc bromide battery having a composition for raising a charging effect when the battery is floated.

It is a further object of the present invention to provide an electrolyte for a zinc bromide battery having a composition which promotes safety.

Another object of the invention is to provide an electrolyte for a zinc bromide battery which is not subject to dendritic formation.

An electrolyte for a zinc bromide secondary battery is composed of a first solution including zinc bromide and a complexing agent which forms a bromide complex from the bromide ions to precipitate the complex in the electrolyte; and a second solution of a zinc compound which is selected from groups of compounds which decompose at a higher voltage than the base solution during battery charging, the concentrations of the first and the second solutions being regulated to provide a concentration of zinc ions which are generated from the first and the second solutions at least 0.5 mol/l higher than bromide ions which are generated from the first solution.

As the second solution of a zinc compound, a solution of zinc chloride or zinc fluoride may be used.

Battery charging can be accomplished at a constant voltage higher than a first voltage at which the first solution starts to decompose and lower than a second voltage at which the second solution is starts to decompose. As for the charging, a floating technique can be used.

According to the present invention, zinc ions remain in the electrolyte after performing long term charging, thus, generation of hydrogen is inhibited by the presence of these zinc ions.

BRIEF DESCRIPTION OF THE DRAWINGS

The present invention will be understood from the detailed description given hereinbelow and from the accompanying drawing of a conventional battery which is given for explanation and understanding only and is not intended to imply limitation to the invention.

In the drawing.

DETAILED DESCRIPTION OF THE PREFERRED EMBODIMENT

Figure 1:
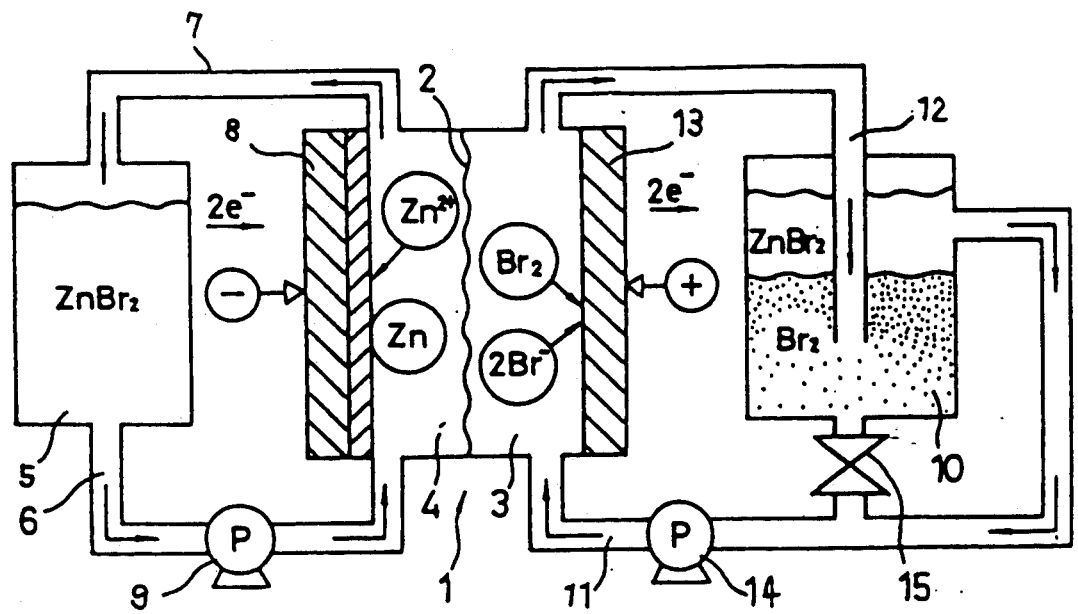
FIG. 1 shows a diagramatic structure of a conventional zinc bromide battery.

A diagramatic structure of a battery is shown in FIG. 1, referring thereto; a battery body 1 is separated by a battery separator 2 into a cathode cell 3 and an anode cell 4. The battery separator 2 is formed of an ion-exchange membrane or a porous membrane.

On the anode side of the battery, electrolyte from an electrolyte tank 5 is circulated via an electrolyte feed line 6, the anode cell 4 and an electrolyte return line 7 in the vicinity of an anode electrode 8. An electrolyte feed pump 9 is installed on the electrolyte feed line 6.

On the cathode side of the battery, electrolyte from a second electrolyte tank 10 is circulated via an electrolyte feed line 11, the cathode cell 3 and an electrolyte return line 12 in the vicinity of the cathode electrode 13. An electrolyte feed pump 14 is installed on the electrolyte feed line 11. A valve 15 is installed on a line which connects the bottom of the tank 0 with the feed line 11.

A battery having the above-mentioned structure operates as follows;

When charging, electrolyte is circulated in the direction of the arrows shown in FIG. 1. A $Zn^{2+} = 2e^- = Zn$ reaction is caused at the anode 8, and a $2Br^- = Br_2 + 2e^-$ reaction is caused at the cathode 13. Bromide generated at the cathode 13 forms molecules, which diffuse in the electrolyte, some of which partially resolve, but most form a bromide complex by reacting with a complexing agent added to the cathode electrolyte and resolved therein. The complex precipitates and is accumulated in the tank 10. On the other hand, when discharging, the reactions caused at electrodes 8 and 13 are reversed, while the electrolyte is circulated. Zn is deposited on the anode electrode 8, and $Br_2$ is generated at the cathode electrode 13. Both deposits are consumed by oxidation or reduction on respective electrodes 8 and 13. Thus electric energy can be obtained.

In order preserve zinc ions in the electrolyte regardless through the floating operation, zinc compounds which decompose to ions at a higher voltage than the zinc bromide are added to the electrolyte.

The above-mentioned zinc compounds may be selected from among compounds such as zinc chloride or zinc fluoride. The standard electrode potential of bromide is indicated by following reaction formula:

$$2Br^- = Br_2 + 2e^- + 1.087 \text{ V } (25°C.)$$

Therefore, zinc compounds having a standard electrode potential of more than 1.087 V are preferable. For example, the standard electrode potentials of chloride and fluoride are shown in the following equations, and according to their potentials, are found to be suitable for use in electrolyte according to the present invention;

$$2Cl^- = Cl_2 + 2e^- + 1.3595 \text{ V } (25°C.)$$

$$2F^- = F^2 + 2e^- + 2.87 \text{ V}.$$

In order to prevent hydrogen generation during the floating operation, ion concentrations of the added zinc compounds are preferably selected to be at least 0.5 mol/l higher than that of the zinc bromide in the electrolyte, therefore, the concentration difference between zinc ions and bromide ions is at least 0.5 mol/l.

When the concentration difference becomes less than 0.5 mol/l, slight amounts of hydrogen generate on portions of the anode electrode surface.

Thus, the composition of the electrolyte, in this embodiment, is determined as 2 mol/l of $ZnBr_2$, 1.0 mol/l of $ZnCl_2$ and 0.5 mol/l of QBr, wherein Q is a complexing agent, therefore, the electrolyte contains 3 mol/l of zinc ions and 2.5 mol/l of bromide ions, the concentration of zinc ions being at least 0.5 mol/l higher than that of bromide ions.

Floating operation using electrolyte having the composition as mentioned above is accomplished at a constant voltage less than the 2 V necessary to produce the $ZnCl_2 = Zn + Cl_2$ reaction but, not less than a voltage at which the $ZnBr_2 = Zn + Br_2$ reaction is started. Then, in the battery, the $ZnBr_2 = Zn + Br_2$ reaction is promoted, and only a slight electric current flows according to the consumption of bromide ions. However, in the electrolyte, 0.5 mol/l of zinc ions remain, thus, generation of hydrogen can be prevented.

Further to say, when using $ZnF_2$ as the zinc compound to be added, charging voltage may be determined to less than about 3.6 V, at which a $ZnF_2Zn + F_2$ reaction is started but not less than a voltage at which a $ZnBr_2 = Zn + Br_2$ reaction is started.

According to the present invention, zinc compounds having characteristics of a higher reaction voltage (a voltage at which an electrode reaction is started) than conventional zinc bromide electrolyte compounds, is added to the electrolyte such that a concentration of zinc ions at least 0.5 mol/l higher than that of bromide ions is provided, thus, hydrogen generation during charging can be prevented by determination of the charging voltage in a range in which decomposition of zinc bromide is started but at which that of the added zinc compound is not incurred when float charging of the battery is performed.

Therefore, according to the prevention of hydrogen generation, energy loss from the battery can be avoided, and duration of the charge can be kept relatively high in relation to the charging time.

Additionally, because hydrogen, which is well known to be inflammable, is not generated, charging of the battery can be accomplished safely.

Furthermore, because the surface of the electrode is not subject to hydrogen, electrodeposition at the electrode can be fully accomplished, therefore deterioration of electrodeposition efficiency can be prevented. More to say, since dedritic formation tends to occur in presence of hydrogen, an electrolyte which prevents hydrogen generation is suitable for raising electrodeposition efficiency thereby increasing charging efficiency.

While the present invention has been disclosed in terms of the preferred embodiment in order to facilitate better understanding thereof, it should be appreciated that the invention can be embodied in various ways without departing from the principles thereof. Therefore, the invention should be understood to include all possible embodiments and modifications to shown embodiments which can be embodied without departing from the principle of the invention as set out in the appended claims.

What is claimed is:

1. An electrolyte for a zinc bromide secondary battery comprising:
   a first solution including zinc bromide and a complexing agent having bromide ions which forms a bromide complex reacted with said zinc bromide and precipitates said complex in said electrolyte; and
   a second solution of a zinc compound selected from groups of compounds which are decomposable at a higher voltage than said zinc bromide decomposes during battery charging, the concentration of said first and second solutions being regulated to provide a total concentration of zinc ions generated therefrom at least 0.5 mol/l higher than that of bromide ions contained in the first solution.

2. An electrolyte for a zinc bromide secondary battery as set forth in claim 1, wherein said second zinc compound solution is a solution of zinc chloride.

3. An electrolyte for a zinc bromide secondary battery as set forth in claim 1, wherein said second zinc compound solution is a solution of zinc fluoride.

4. An electrolyte for a zinc bromide secondary battery as set forth in claim 1, wherein said charging is accomplished at a constant voltage higher than a voltage at which decomposition of said first solution is started and lower than a voltage at which decomposition of said second solution is started.

5. An electrolyte for a zinc bromide secondary battery as set forth in claim 4, wherein said charging is accomplished according to a floating charge technique.

* * * * *